3,093,594
METHOD OF MAKING HALOPHOSPHATE PHOSPHORS

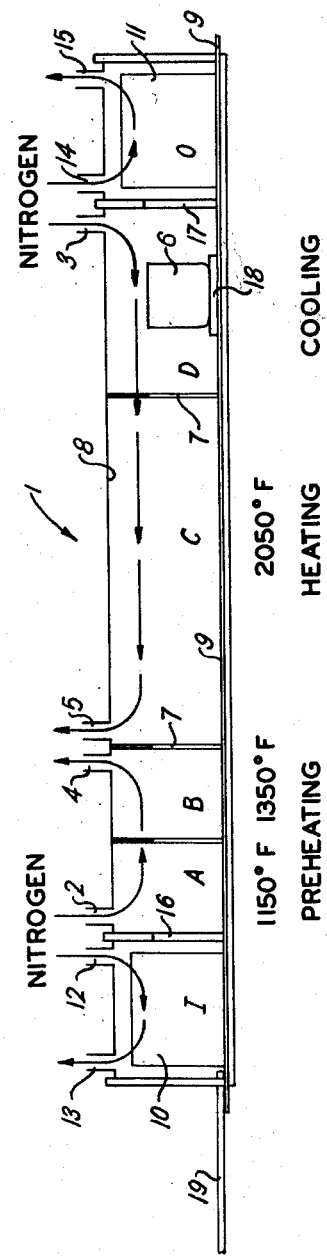

Horace Horalan Homer, Arlington, and Keith Huestis Butler, Marblehead, Mass., assignors, by mesne assignments, to Sylvania Electric Products Inc., Wilmington, Del., a corporation of Delaware
Filed Dec. 10, 1958, Ser. No. 779,370
8 Claims. (Cl. 252—301.4)

This invention relates to halophosphate phosphors, and particularly to calcium halophosphate phosphors activated with antimony and manganese. The invention is especially directed to a method of making a high-efficiency phosphor of that type.

In United States Patent 2,755,254 to Keith H. Butler, a method is shown of making a halophosphate phosphor in a continuous manner in an elongated furnace, through which the mixed raw materials were moved in open silica "boats" in a substantially continuous manner from one end of the furnace to the other, against a counter-flow of inert gas. The boats were advanced in a series of steps from one end of the furnace to the other, and the inert gas flow was in a direction opposite to that of the boat travel.

That method achieved a considerable improvement over phosphors prepared by the previous covered-crucible method of firing.

The present invention achieves a still further reduction in particle size and increase in efficiency of a halophosphate phosphor.

These advantages are obtained by the use of at least two heating zones, each of different temperatures, through which the phosphor materials pass in succession. The second heating zone can be at about 2000° F., the same as in the previously-mentioned patent; the first or preheating zone should be at a much lower temperature, for example between 1000° F. and 1600° F. In the latter zone, the flow of inert gas should be in the same direction as that of the travel of the phosphor materials; in the higher-temperature zone, it should be in the opposite direction. That can be achieved by flowing inert gas into the furnace at each end and flowing it out through a vent at the boundary of the two zones.

The improvement which this opposed gas flow gives over a mere counter-flow in the same direction through both zones is shown in the following table:

|  | First Zone, °F. | Second Zone, °F. | Particle Size | Relative Brightness |
|---|---|---|---|---|
| Counter-Flow | 1,460 | 2,000 | 6.8 | 105 |
| Opposed-Flow | 1,460 | 2,000 | 5.4 | 107 |

In the above table as in subsequent ones, the brightness is given in relative but linear units, that is, the brightness in absolute units is directly proportional to the value given in relative units; and the particle size is given in standard SSS units, that is, Fisher "sub sieve size" units.

In both cases above, and in the other cases given below, the materials were in the first zone about half as long as in the second zone, that is about 30 minutes in the first zone and 64 minutes in the second. On emerging from the second zone, the phosphor passed through a cooling zone for about 32 minutes.

In other words, the materials travelled at a constant rate through the furnace, in which the pre-heat zone was 15 inches long, the main heating zone 32 inches long and the cooling zone 16 inches long.

In the "counter flow" test, nitrogen gas entered the furnace at the output end, flowed back over the cooling zone, high-temperature zone and pre-heat zone; in the "opposed flow" test nitrogen entered at the output end, as before, flowed back over the cooling zone and high temperature zone and flowed out of the furnace at a vent at the boundary of the high temperature and pre-heat zones. Another stream of nitrogen, in a direction opposed to that of the first-mentioned stream, flows in the input end of the furnace, over the pre-heat zone and out an exhaust vent near the boundary of the pre-heat and high temperature zones. The flow of nitrogen was at a rate of 5.6 complete atmosphere changes per hour.

The cooling zone keeps the phosphor in an atmosphere of inert gas until its temperature falls to a value low enough, say about 400° F., to prevent oxidation of the phosphor when it is removed from the furnace and placed in the ambient atmosphere.

By using antimony tetroxide or other compounds in which antimony is in a higher valence state than in the trioxide, the particle size can be kept down with a single firing method, as previously known.

However, antimony tetroxide cannot be obtained commercially in lots large enough and pure enough for large-scale production of phosphors. It is therefore necessary to use the trioxide, and when that is used, two-zone or multi-zone firing is necessary to produce a high efficiency phosphor of small enough particle size. Moreover, firing in more than one zone is advantageous also when higher-valence antimony compounds, such as the tetroxide, are used, for it gives greater reproducibility and easier control.

When antimony trioxide is used, the advantage of two-zone firing over single-zone firing is apparent from the following table:

|  | Temperature, ° F. | | Particle size | Relative brightness |
|---|---|---|---|---|
|  | Zone #1 | Zone #2 | | |
| Single-zone firing |  | 1,975 | 8.7 | 103 |
| Double-zone firing | 1,590 | 1,975 | 4.4 | 107 |

In the single-zone firing, a counter flow of nitrogen was used through the whole furnace; in the double-zone firing an opposed-flow, from each end of the furnace to an outlet at the boundary of the zones, was used.

Although 1590° F. was used for the first firing in the above table, we prefer to divide the pre-heating itself into two or more zones at different temperatures, for example one at about 1150° F. and a second at 1350° F. This allows the water, carbon dioxide and the like to be driven off at a temperature too low for appreciable reaction of the phosphor, and the initial stage of the reaction of the materials to begin in the second zone. By keeping the temperature in the first pre-heat zone low, any oxidation from any air that may get into the nitrogen, or from any water vapor present, is kept at a minimum. A temperature of 2050° F. is very effective for the high temperature zone, a range of 1900° F. to 2150° F. being generally satisfactory.

The use of a series of heating zones at different temperatures allows the various reactions which occur during firing to be separated out, so that the conditions under which each occurs can be independently controlled.

For example, as already explained, some carbon dioxide and any uncombined water present can be driven off in the first low-temperature zone, before the components of the mixture begin to react with each other appreciably, and the initial stages of the actual reaction controlled in the second zone. If that zone is at a temperature of about 1350° F., for example, and secondary calcium phosphate used in the mix as the source of phosphate, the X-ray pattern of secondary calcium phosphate disappears in samples taken from that zone, indicating that the secondary phosphate has undergone a change, yet the apatite pattern of the finished phosphor does not appear in samples from that zone, or appears only as a faint trace.

The color of the mixture changes from white to the faint beginning of a gray color at the end of the zone, and changes to a blue-gray color in the 1350° F. zone. This resulting blue-gray color is believed to be due to higher oxides of manganese formed during decomposition of manganous carbonate, which was an ingredient of this particular mixture. With certain other compounds of manganese, such as secondary manganous phosphate, the gray color may not appear.

The apatite pattern corresponding to the halophosphate is developed strongly during the firing in the high temperature zone, which is at a temperature between about 1900° F. and about 2150° F.

Other objects, advantages and features of the invention will be apparent from the following specification, taken in connection with the attached drawing, in which the FIGURE is a schematic drawing of a furnace used in practicing one embodiment of the invention.

The drawing shows schematically a furnace 1 having four principal zones in succession, A, B, C, D, the first heated to 1150° F., the next to 1350° F., a third to 2050° F., and a fourth zone for cooling the phosphor after it emerges from the third zone. The furnace can be of the ordinary open-hearth type, electrically-heated, although other types can be used, as explained later. The nitrogen flow is indicated by arrows. Although the arrows are placed near the top of the furnace for convenience, the nitrogen flow will, however, cover the whole volume of the furnace. The nitrogen enters through ports 2, 3, at opposite ends of the furnace, and leaves through ports 4, 5, near the boundary of the preheating and heating zones, B and C, respectively, and on opposite sides thereof, so that the flow will occur in these two main zones in opposite directions. The flow in the cooling zone D is, as shown, in the same direction as in the high temperature, or heating, zone C.

The flow in this manner insures that antimony chloride fumes from the reaction in the main heating chamber C will not flow into preheating zones A, B, to cause undesirable reactions there. It also insures that there will be no substantial heat flow by convection from a hot zone to a cooler one.

The raw material mixture is placed in so-called refractory "boats" 6, which can be of silica, a convenient size boat being about 6 inches wide, 8 inches long, and 4½ inches high. At the boundary of each zone a partition 7 extends from the top 8 of the furnace 1 to just above the top of the boat 6, and from the sides of the furnace to the sides of said boat, allowing clearance for the boat 6 to pass through it. This, together with the baffle effect of the end boat in each zone, and the direction of gas flow, aids in maintaining the separation of temperature conditions in each zone and in keeping the heat losses between zones at a minimum. The temperature of each zone can then be regulated by the amount of heat supplied to each zone by gas burners or electrical heating units.

Although for convenience and to avoid interfering with the legends, only one boat 6 is shown in the furnace 1, there will in practice be a continuous series of boats in the furnace 1, each boat close to the next, the boats being pushed through the furnace over refractory skid rail 9, or a set of such rails, such skid rails being well-known in the art. The boats 6 can be moved continuously if desired, or indexed in steps. The latter will generally be desirable, so that doors can be used at the ends of the oven, and opened only between indexing steps.

In order to reduce air leakage into the furnace when the door is opened, an entry or inlet zone I is used between the preheating zone A and the door 10, on that end of the furnace and an exit or outlet zone O between zone D and the door 11 on the other end of the furnace. Each of the inlet and outlet zones I, O has a nitrogen inlet port 12, 14 and an outlet port 13, 15 so that the air admitted by opening the door 10, 11 can be flushed out with nitrogen to avoid its entering the heated or cooling zones, A, B, C, D.

The furnace walls can be made of the refractory materials customary for such use, and the heating units are preferably electrical, for example, so-called "Globar" resistance units, which are silicon carbide rods, so that they can be placed directly in the zones which they are to heat. If gas heating is desired, a so-called "muffle" furnace or the like must be used to keep the heating gas and its products of combustion out of contact with the mixture being fired, but the zone separation will not be complete and the method accordingly, less effective.

The use of a series of heating zones at different temperatures allows the various reactions which occur during firing to be separated out, so that the conditions under which each occurs can be independently controlled.

For example, as already explained, some carbon dioxide and any water present can be driven off in the first low-temperature zone, before the components of the mixture begin to react with each other, and the initial states of the actual reaction controlled in the second zone. If that is at a temperature of about 1350° F., for example, and secondary calcium phosphate used in the mix as the source of phosphate, the X-ray pattern of secondary calcium carbonate is absent from samples taken in that zone, yet the apatite pattern of the finished phosphor does not appear in the samples, or at most appears as only a very faint trace.

As previously explained, the color of the mixture generally changes from white to the faint beginning of a gray color at the end of the zone, and to a blue-gray color in the 1350° F. zone.

The apatite pattern corresponding to the halophosphate appears during the firing in the high temperature zone, which is at a temperature between about 1900° F. and about 2150° F.

As one example of a starting mixture of raw materials, we mixed intimately as fine powders, the following materials in the following proportions:

| Material: | Weight in grams |
|---|---|
| $CaHPO_4$ (3% $H_2O$ by weight) | 631.0 |
| $CaCO_3$ | 195.9 |
| $CaF_2$ (3% $H_2O$ by weight) | 47.4 |
| $NH_4Cl$ | 21.8 |
| $MnCO_3$ | 22.4 |
| $Sb_2O_3$ | 26.4 |
| Total | 944.9 |

A quantity of this mixture, or "charge" was placed in a silica boat of the dimensions previously given, so as to leave a distance of about 1½ inches between the top of the charge and the top of the boat. This leaves a "dead gas" space directly over the mixture, and which is carried along with it, so that when the mixture reacts, giving off antimony chloride, an atmosphere containing that chloride remains over the mixture and allows the reaction to proceed at the proper rate to produce a phosphor thoroughly reacted throughout its volume, but without the so-called "pink top" which forms if the boat is filled, and which has to be removed as useless. Only the non-pink material underneath is useful as phosphor.

The open boat 6, with no cover, is then placed on a flat refractory plate 18, for example, of fire-brick material or ceramic, and pushed into the oven onto skid rail 9 through a door 10, which is opened for the purpose, and then closed. The door is in the side of the furnace.

The door 10 should open into an air-lock chamber, or series of such chambers, to reduce air leakage into the furnace. By an air-lock chamber we mean a chamber having a door at each end, so that one door can be opened to admit a boat while the other door is closed, and then, after the boat is in the chamber, the first-mentioned door can be closed and the second-mentioned door, which can be door 10, opened to admit the boat to the inlet chamber I.

The boat 9, with the raw materials in it, is then in the inlet zone I, in which it will remain for about 4.0 minutes, being pushed ahead by a rod 19 as each new boat is pushed through the side door 10, on a ceramic plate 11 such as previously described, which travels over skid rail 9. Each ceramic plate will be in contact with the immediately neighboring plates. Entry zone I is not heated, except for heat leakage from the preheat zone A. The push rod 19 makes a sliding fit through the end 20 of the furnace, and pushes the ceramic plate 18.

The boat is then pushed into preheat zone A. Zone A can be at a temperature of about 1150° F., for example. Boat 6 remains there about 11.5 minutes, while the $NH_4Cl$ breaks down into $NH_3$ and $HCl$, that is, into ammonia and hydrochloric acid. The ammonia is removed by the gas flow and the hydrochloric acid reacts with the calcium carbonate to form calcium chloride with liberation of water and carbon dioxide.

The boat is then pushed along through the refractory partition into the second preheat zone, which we have called zone B, and which can be at about 1350° F., for example. The boat remains in this zone for about 11.5 minutes, while reaction occurs which causes the crystal structure of the secondary calcium phosphate ($CaHPO_4$) to be lost.

Next, the boat moves into the main heating zone C, maintained at about 2050° F. and remains there for about 38.8 minutes. In this zone, the actual conversion of the raw materials to the halophosphate occurs, and the apatite X-ray pattern of the latter will be present in material taken from this zone. At the same time, the activation with manganese and antimony occurs, some of the antimony entering the crystal lattice and some of the antimony oxide reacting with some of the chloride present, to form antimony chloride, which volatilizes off.

After that, the boat is moved into the cooling zone for about 27.3 minutes, where the temperature should be below about 1000° F., and is preferably much lower. There are no heating units in this zone, and it is even desirable to have part of the zone water-cooled. For example, the part of the zone nearest the high temperature zone can be maintained at about 660° F. simply by being insulated as well as possible from the heated zone C, and the remainder kept at a temperature of about 360° F. by surrounding that part of the zone with water cooling coils.

The first part of the cooling zone can be about 21.5 inches long, for example, and the water-cooled part 43.5 inches long. The boat will then be in the first part of the cooling zone for 9.0 minutes, the temperature there being about 680° F., and in the water-cooled portion for 18.3 minutes, the temperature there being about 360° F. after which the boat 6 will pass through the unheated exit zone O for about 4.0 minutes, and then be pushed out through the door 11, which is afterward closed.

The resultant phosphor will have high efficiency and small particle size, and will be very uniform throughout its volume. The useless "pink top" layer, ordinarily present with other methods using antimony trioxide, will be missing, so all the phosphor in the boat will be useful.

In the above description, the times were given to the first decimal place. That is not to be taken, however, as showing that the timing is extremely critical, but merely resulted, in the specific example given, from the fact that the boats were pushed forward in the furnace at a constant rate of indexing, so the times were determined by the lengths of the various zones. The exact length of the zones was determined to some extent by mechanical considerations of convenience in manufacture, so that standard parts could be used where practicable.

Deliberate variations in the time in the various zones can be made by varying the rate of indexing and a wide range of time has been found to give useful phosphors.

The doors, 10, 11, can slide upward out of the way, each through a slot in the top 8 of the furnace.

For pushing the ceramic plate 19 through door 11, another push-rod similar to push-rod 19 can be used, extending through the side wall of the furnace opposite the door 11, and consequently not appearing in the figure.

The partitions 7 can be constructed of fire brick, and can be, for example about 2 inches in thickness. They extend downward from the top 8 of the furnace and inward from the sides, to provide just enough space for the boats 6 to pass through with reasonable clearance.

In the foregoing, the applicants have described the use of one or more zones at temperatures between 1000° F. and 1600° F., and one or more zones at temperatures between 1900° F. and 2150° F. The particle size can often be controlled even more precisely by the addition of one or more zones at temperatures intermediate the other two ranges, that is between 1600° F. and 1900° F.

Although specific proportions of materials were given in the specific example, they are not critical and can be varied considerably in accordance with the knowledge of the art. Other starting materials can be used, as is also known in the art.

What I claim is:

1. The method of making a halophosphate phosphor, said method comprising preheating at a temperature between about 1000° F. and 1600° F. the mixture of materials necessary to make the phosphor, said preheating being at a temperature below that at which the materials react with each other then heating the resultant mixture of materials at a temperature between 1900° F. and 2150° F. and then cooling the phosphor, at a temperature below about 1000° F., the preheating, heating and cooling being in an atmosphere of gas inert with respect to the materials used.

2. The method of making a halophosphate phosphor, said method comprising: preheating the materials necessary to form the phosphor, said preheating being at a temperature high enough to remove any water vapor and at least a substantial part of any carbon dioxide that may be present, but too low for any substantial reaction between the materials to form the apatite structure, then firing the resultant mixture at a temperature high enough to cause the materials to react to form a halophosphate phosphor, and then cooling the mixture at a temperature below about 1000° F., the preheating, heating and cooling being in an atmosphere of gas inert with respect to the materials used.

3. The method of claim 2, in which the materials are gradually moved through zones heated to the proper temperatures, and in which a flow of a gas inert with respect to the materials is maintained in the direction of motion of the materials during the preheating, and opposite to the direction of motion during the subsequent heating at higher temperature.

4. The method of claim 2, in which the gas is nitrogen.

5. The method of claim 2, in which the time of pre-firing is about half the time of high-temperature firing.

6. The method of claim 2, in which the preheating is at a temperature between 1000° F. and 1600° F. and the main firing between 1900° F. and 2150° F.

7. The method of making a calcium halophosphate phosphor, said method comprising: preheating a mixture including secondary calcium phosphate and calcium carbonate, said preheating being at a temperature high enough to remove any water vapor that may be present and at least a substantial part of the carbon dioxide in the calcium carbonate, but too low for any substantial reaction between the components of the mixture; then firing the resultant mixture at a temperature high enough to cause the disappearance of the X-ray pattern characteristic of secondary calcium phosphate but not high enough to cause any appreciable appearance of the X-ray pattern characteristic of calcium halophosphate, and continuing the firing until the first-mentioned X-ray pattern disappears; and then continuing the heating at a higher temperature, high enough to cause the appearance of the X-ray pattern of calcium halophosphate and to cause the resultant material to fluoresce, and then cooling the mixture at a temperature below about 1000° F., the preheating, heating and cooling being in an atmosphere of gas inert with respect to the materials used.

8. The method of claim 7, in which the mixture of materials is moved in a given direction through a furnace during preheating, heating, and cooling, so that the mixture passes through preheating, heating, and cooling zones in succession and in which an atmosphere of a gas inert with respect to the phosphor flows over the mixture, the gas in the preheating zone flowing toward the heating zone and in the direction of movement of the materials, the gas in the heating and cooling zones flowing oppositely to the direction of motion of the materials and toward the preheating zone.

References Cited in the file of this patent
UNITED STATES PATENTS

| | | |
|---|---|---|
| 2,086,206 | Bailey | July 6, 1937 |
| 2,173,825 | Curtis | Sept. 26, 1939 |
| 2,415,159 | Bradley | Feb. 4, 1947 |
| 2,755,254 | Butler | July 17, 1956 |
| 2,772,241 | Ranby | Nov. 27, 1956 |
| 2,862,888 | Ross | Dec. 2, 1958 |
| 2,904,516 | Ross et al. | Sept. 15, 1959 |